US011644737B2

(12) United States Patent
Sakamoto et al.

(10) Patent No.: US 11,644,737 B2
(45) Date of Patent: May 9, 2023

(54) PROJECTOR DEVICE

(71) Applicant: SEIKO EPSON CORPORATION, Tokyo (JP)

(72) Inventors: Kenji Sakamoto, Matsumoto (JP); Yohei Sakai, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 17/587,029

(22) Filed: Jan. 28, 2022

(65) Prior Publication Data
US 2022/0244626 A1 Aug. 4, 2022

(30) Foreign Application Priority Data

Jan. 29, 2021 (JP) .............................. JP2021-012997

(51) Int. Cl.
G03B 21/14 (2006.01)
(52) U.S. Cl.
CPC .................................. G03B 21/145 (2013.01)
(58) Field of Classification Search
CPC .. G03B 21/145; G03B 21/14; G03B 21/2033; G03B 21/54; F16M 11/04; F16M 13/027
See application file for complete search history.

(56) References Cited

U.S. PATENT DOCUMENTS

| 2010/0321646 A1* | 12/2010 | Nakano | G03B 21/14 353/119 |
| 2013/0264434 A1* | 10/2013 | Unno | F16M 7/00 248/58 |
| 2015/0268540 A1* | 9/2015 | Nagatani | G03B 21/005 353/119 |
| 2016/0209736 A1* | 7/2016 | Sakurai | G03B 21/145 |

FOREIGN PATENT DOCUMENTS

JP 2015-004780 A 1/2015

* cited by examiner

Primary Examiner — Magda Cruz
(74) Attorney, Agent, or Firm — Oliff PLC

(57) ABSTRACT

A projector includes: an exterior case having plurality of penetration holes; first base member fixed inside the exterior case and made of metal or crystalline resin; illumination unit fixed to first base member; image forming unit fixed to first base member; optical projection unit coupled to image forming unit; and second base member fixed inside exterior case and coupled to first base member, and having lower rigidity than first base member. First base member has plurality of first fixing parts which are arranged corresponding to position of part of plurality of penetration holes in exterior case and to which suspension fitting is fixed. Second base member has second fixing part which is arranged corresponding to position of penetration hole other than penetration holes having plurality of first fixing parts arranged therein, of plurality of penetration holes in exterior case, and to which suspension fitting is fixed.

8 Claims, 9 Drawing Sheets

PROJECTOR DEVICE

The present application is based on, and claims priority from JP Application Serial Number 2021-012997, filed Jan. 29, 2021, the disclosure of which is hereby incorporated by reference herein in its entirety.

BACKGROUND

1. Technical Field

The present disclosure relates to a projector and a projector device.

2. Related Art

As installation forms of a projector, an installation form where the projector is placed at the top of a desk with the projection lens facing a projection target surface such as a screen, and an installation form where the projector is turned upside down from the above form and is suspended from a ceiling surface or a wall surface, are traditionally known. In the present specification, the former form is referred to as desktop and the latter form is referred to suspension. When installing the projector in the suspended state, fixing the projector to the ceiling surface or the wall surface via a suspension fitting is a common method.

Recently, the use of the projector has been extending to a broader range. Therefore, in some cases, the coupling part between the projector and the suspension fitting may deteriorate depending on the installation environment. For example, it is now assumed that the projector is installed in the state of being suspended from the ceiling in an environment where oily smoke is floating in the air in a room. In this case, due to the interaction between a stress generated at the coupling part between the projector and the suspension fitting, and the oily smoke, a phenomenon called solvent cracking may occur in a plastic that forms the casing and the coupling strength between the projector and the suspension fitting may drop. The cause of the drop in the coupling strength is not necessarily limited to the use of the plastic but may also be, for example, the rusting of a metal material, or the like.

As a method for restraining the drop in the coupling strength between the projector and the suspension fitting, JP-A-2015-4780 discloses a projector having a casing made of a resin, a metal shield arranged inside the casing, and a flange nut attached to the casing. A screw penetrates the casing from the upper surface of a ceiling suspension fitting and is fixed in the flange nut, thus fixing the projector in the suspended state to the ceiling suspension fitting. An optical unit, a power supply unit, and the like are fixed to the metal shield.

However, in the case of the projector disclosed in JP-A-2015-4780, which is fixed at four positions in the ceiling suspension fitting with screws and flange nuts, when the ceiling suspension fitting is strained, the strain may affect the metal shield via the screws at the four positions and may strain the metal shield as well. Consequently, the optical unit fixed to the metal shield may shift from the original optical position thereof. Thus, the quality of a projection image may drop.

SUMMARY

In order to solve the foregoing problem, a projector according to an aspect of the present disclosure includes: an exterior case having a plurality of penetration holes to which a suspension fitting is attached; a first base member having a first surface and a second surface opposite to the first surface, and fixed inside the exterior case and made of a metal or a crystalline resin; an illumination unit fixed to the first surface of the first base member; an image forming unit fixed to the first surface of the first base member and generating image light from light emitted from the illumination unit; an optical projection unit coupled to the image forming unit and projecting the image light emitted from the image forming unit; and a second base member fixed inside the exterior case and coupled to the first base member, and having a lower rigidity than the first base member. The first base member has a plurality of first fixing parts which are provided at the second surface of the first base member and arranged corresponding to a position of a part of the plurality of penetration holes in the exterior case and to which the suspension fitting is fixed. The second base member has a second fixing part which is arranged corresponding to a position of a penetration hole other than the penetration holes having the plurality of first fixing parts arranged therein, of the plurality of penetration holes in the exterior case, and to which the suspension fitting is fixed.

A projector device according to another aspect of the present disclosure includes: a projector; and a suspension fitting fixing the projector in a suspended state. The projector includes: an exterior case having a plurality of penetration holes to which the suspension fitting is attached; a first base member having a first surface and a second surface opposite to the first surface, and fixed inside the exterior case and made of a metal or a crystalline resin; an illumination unit fixed to the first surface of the first base member; an image forming unit fixed to the first surface of the first base member and generating image light from light emitted from the illumination unit; an optical projection unit coupled to the image forming unit and projecting the image light emitted from the image forming unit; and a second base member fixed inside the exterior case and coupled to the first base member, and having a lower rigidity than the first base member. The first base member has a plurality of first fixing parts which are provided at the second surface of the first base member and arranged corresponding to a position of apart of the plurality of penetration holes in the exterior case and to which the suspension fitting is fixed. The second base member has a second fixing part which is arranged corresponding to a position of a penetration hole other than the penetration holes having the plurality of first fixing parts arranged therein, of the plurality of penetration holes in the exterior case, and to which the suspension fitting is fixed. The suspension fitting has an attachment member fixed to the plurality of first fixing parts and the second fixing part via the exterior case.

DESCRIPTION OF EXEMPLARY EMBODIMENTS

Figure 1:
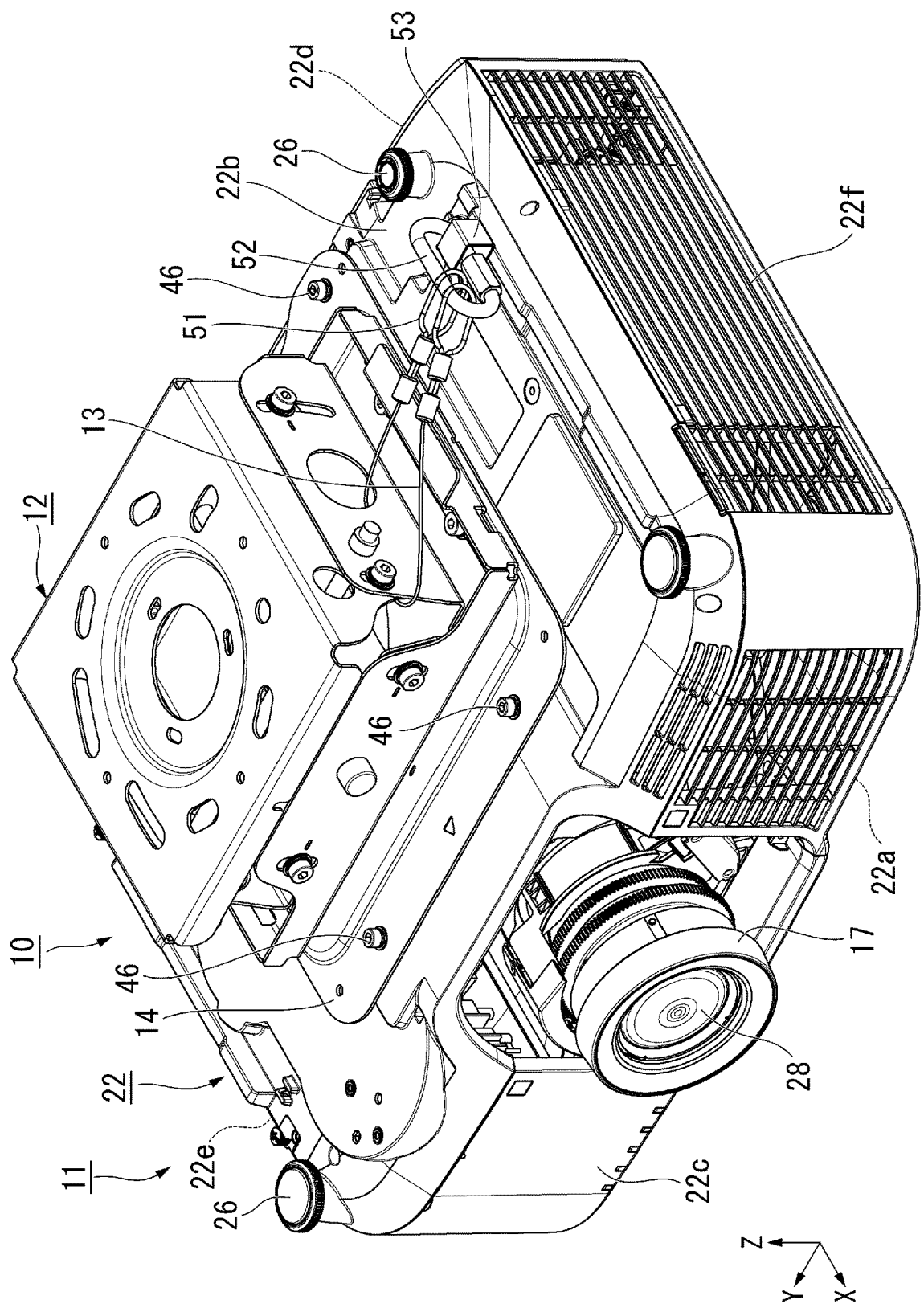
FIG. 1 is a perspective view showing a projector device according to an embodiment.

An embodiment of the present disclosure will now be described with reference to FIGS. 1 to 8.

In the drawings described below, the dimension of some components may not be shown to scale in order to make each component easier to view.

Figure 2:
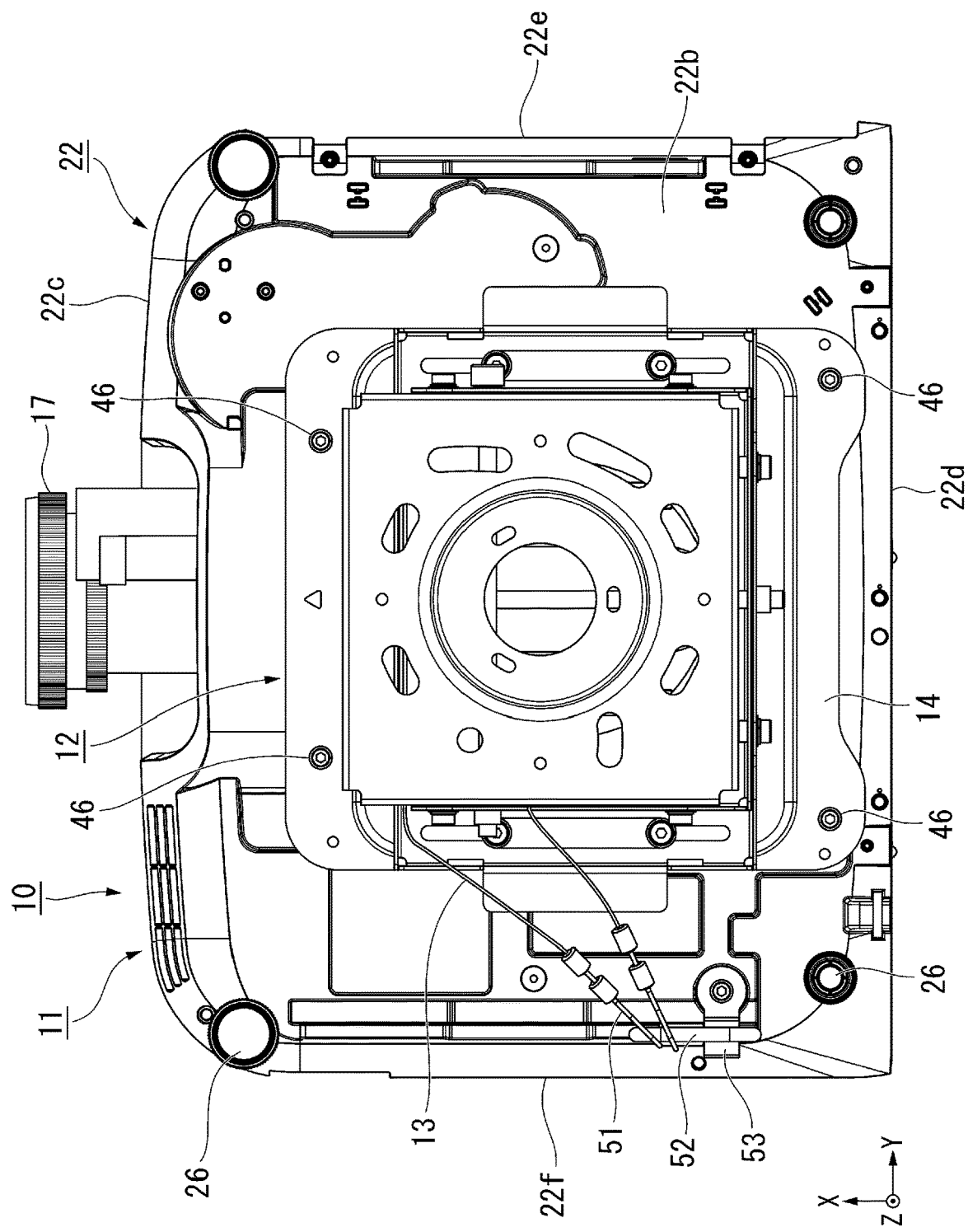
FIG. 2 is a plan view of the projector device.
Figure 3:
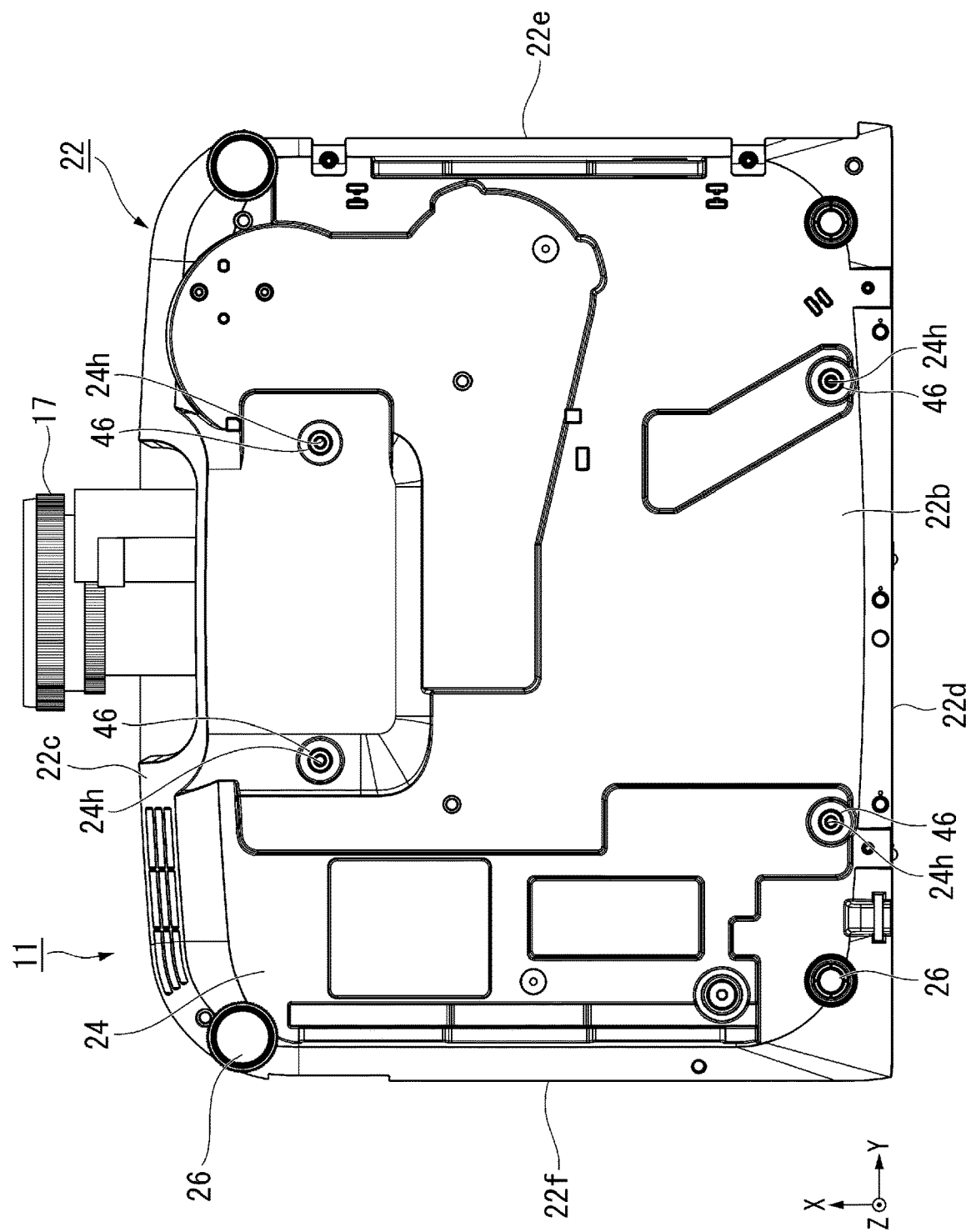
FIG. 3 is a plan view of a projector.
Figure 4:
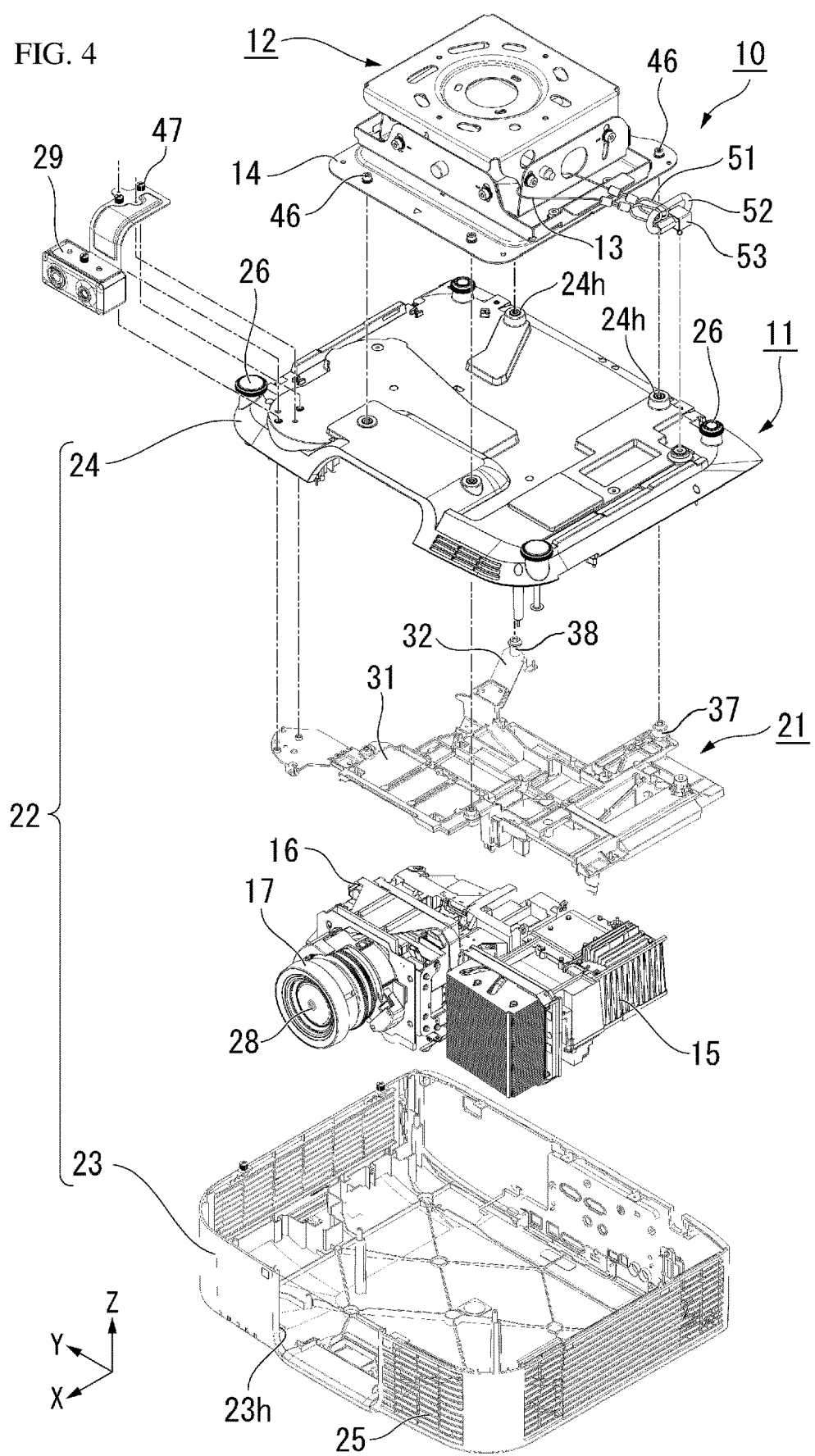
FIG. 4 is an exploded perspective view of the projector device.
Figure 5:
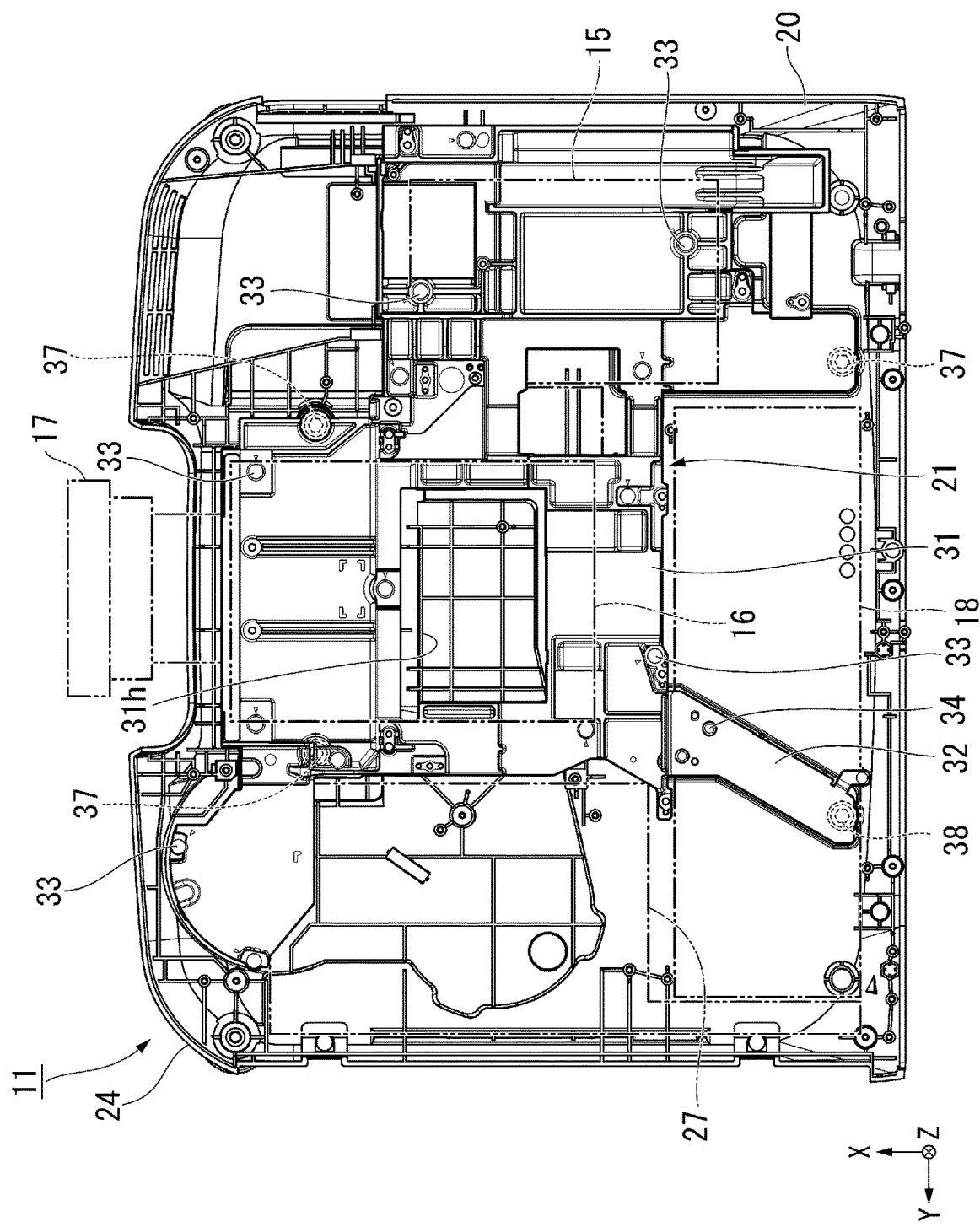
FIG. 5 is a plan view showing a state where a base member is fixed to a lower case.

FIG. 1 is a perspective view showing a state where a projector device 10 according to this embodiment is installed. FIG. 2 is a plan view of the projector device 10. FIG. 3 is a plan view of a projector 11, eliminating a suspension fitting 12 from FIG. 2. FIG. 4 is an exploded perspective view of the projector device 10. FIG. 5 is a plan view showing a state where a base member 21 is fixed to a lower case 24.

As shown in FIG. 1, the projector device 10 has the projector 11, the suspension fitting 12 fixing the projector 11 in a suspended state, and a fall prevention wire 13. The projector 11 is fixed to a ceiling surface via the suspension fitting 12. However, the ceiling surface is not illustrated in FIG. 1. The projector device 10 may not necessarily be installed at the ceiling surface and may be installed at a wall surface.

The suspension fitting 12 has an attachment metal fitting 14 fixed to a plurality of first fixing parts 37 and a second fixing part 38 via an exterior case 22, described later.

The attachment metal fitting 14 in this embodiment is equivalent to an attachment member in the claims.

In the drawings used in the description below, an XYZ orthogonal coordinate system is used according to need.

An X-axis is an axis on which the optical axis of light emitted from an optical projection unit 17 is projected and which is laid along a front-back direction, when the projector device 10 is viewed from above. A Z-axis is an axis orthogonal to the X-axis and laid along an up-down direction. A Y-axis is an axis orthogonal to the X-axis and the Z-axis and laid along a left-right direction. In the description of this embodiment, the near side to an observer located at the rear of the projector device 10 is defined as −X side and the far side is defined to as +X side. The upper side is defined as +Z side and the lower side is defined as −Z side. The right side is defined as +Y side and the left side is defined as −Y side. The X-axis is defined as a direction in which a front surface 22c and a back surface 22d of the exterior case 22, described later, are laid opposite each other. The Y-axis is defined as a direction in which a right side surface 22e and a left side surface 22f of the exterior case 22 are laid opposite each other. The Z-axis is a direction in which a top surface 22a and a bottom surface 22b of the exterior case 22 are laid opposite each other.

The projector 11 can be installed both in a desktop form and in a ceiling-suspended form. In this embodiment, the projector 11 is installed at a ceiling surface in a position that is upside down from the desktop form. That is, the projector 11 is installed at the ceiling surface in such a position that the top surface 22a of the exterior case 22 faces downward while the bottom surface 22b faces upward. In this embodiment, the installation form where the projector 11 is installed at the ceiling surface is referred to as ceiling-suspension. As for the name of each surface of the exterior case 22, the surface facing upward when the projector 11 is installed in the desktop position is referred to as the top surface 22a and the surface facing downward is referred to as the bottom surface 22b. The name of each part is similarly defined.

As shown in FIGS. 4 and 5, the projector 11 has the exterior case 22, an illumination unit 15, an image forming unit 16, the optical projection unit 17, a power supply unit 18, a control unit 19 (see FIG. 8), a cooling fan 20, an air suction duct 27, the base member 21, and a camera unit 29.

As shown in FIG. 1, the exterior case 22 is a box-like member substantially in the shape of a rectangular parallelepiped and hollow inside. The exterior case 22 has six surfaces made up of the top surface 22a, the bottom surface 22b, the front surface 22c, the back surface 22d, the right side surface 22e, and the left side surface 22f. As for the name of each surface of the exterior case 22, the surface facing upward when the projector device 10 is installed in the desktop position is referred to as the top surface 22a and the surface facing downward is referred to as the bottom surface 22b. The surface located on the near side to the observer is referred to as the front surface 22c and the surface located on the far side is referred to as the back surface 22d. The side surface located on the right side is referred to as the right side surface 22e and the side surface located on the left side is referred to as the left side surface 22f.

As shown in FIG. 4, the exterior case 22 is formed of an upper case 23 and the lower case 24. That is, the exterior case 22 is formed of two cases split in the up-down direction. The exterior case 22 is formed of a resin material.

The upper case 23 is a case covering each unit from above when the projector device 10 is installed in the desktop position. At the front surface of the upper case 23, a vent 25 and an opening 23h accommodating the optical projection unit 17 or the like are provided.

The lower case 24 is a case covering each unit from below when the projector device 10 is installed in the desktop position. As shown in FIGS. 1 to 3, at the bottom surface of the lower case 24, a leg part 26 supporting the projector 11 when the projector device 10 is installed in the desktop position is provided. In this embodiment, two leg parts 26 are provided at a front part of the bottom surface and two leg parts 26 are provided at a back part of the bottom surface. However, the number and arrangement of leg parts 26 are not particularly limited.

The illumination unit 15 has, for example, a laser light source and a wavelength conversion element or the like, though not illustrated. The illumination unit 15 condenses blue laser light emitted from the laser light source via a condensing lens, as excitation light, then makes the condensed light incident on the wavelength conversion element including a phosphor, and emits white light made up of blue laser light and yellow fluorescence. However, the illumination unit 15 is not limited to the configuration using the laser light source and the wavelength conversion element and may employ, for example, a configuration using a laser light source singly or a configuration using an LED (light-emitting diode) or a discharge-type light source lamp. The illumination unit 15 may also have a heat radiation member such as a heat sink discharging heat generated by the light emission source to outside.

Figure 7:
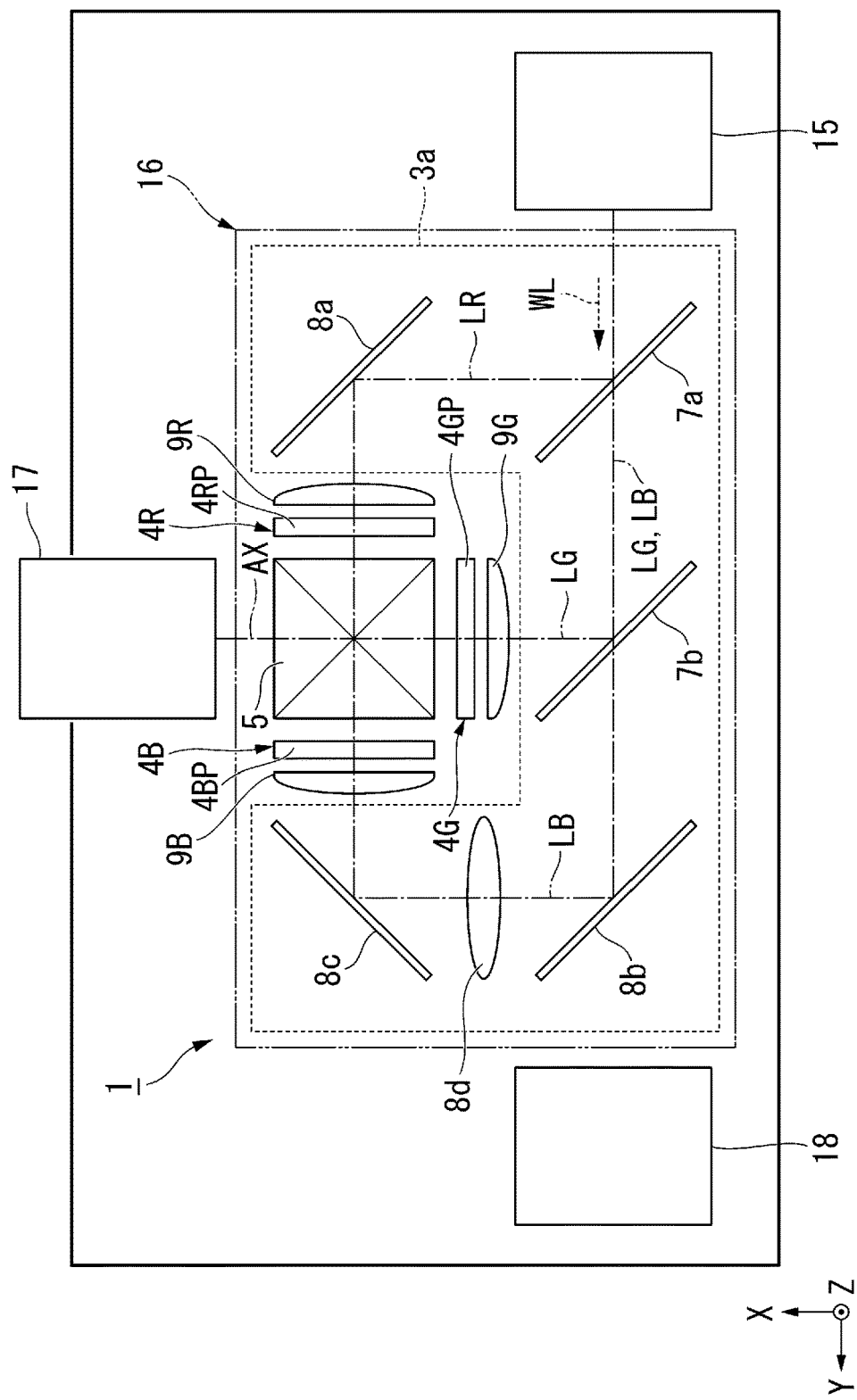
FIG. 7 shows a schematic configuration of an image forming unit.

FIG. 7 is a schematic view showing the configuration of the image forming unit 16.

As shown in FIG. 7, the image forming unit 16 has a color separation system 3a, a light modulation device 4R, a light modulation device 4G, a light modulation device 4B, and a light combining system 5. The image forming unit 16 generates image light from light emitted from the illumination unit 15.

The color separation system 3a separates white light WL emitted from the illumination unit 15 into red light LR, green light LG, and blue light LB. The color separation system 3a has a first dichroic mirror 7a, a second dichroic mirror 7b, a first reflection mirror 8a, a second reflection mirror 8b, a third reflection mirror 8c, and a relay lens 8d.

The first dichroic mirror 7a separates the white light WL emitted from the illumination unit 15 into the red light LR and light made up of a mixture of the green light LG and the blue light LB. The first dichroic mirror 7a reflects the red light LR and transmits the green light LG and the blue light LB. The second dichroic mirror 7b separates the light made up of the mixture of the green light LG and the blue light LB into the green light LG and the blue light LB. The second dichroic mirror 7b reflects the green light LG and transmits the blue light LB.

The first reflection mirror 8a is arranged in the optical path of the red light LR. The first reflection mirror 8a reflects the red light LR reflected by the first dichroic mirror 7a, toward the light modulation device 4R. The second reflection mirror 8b and the third reflection mirror 8c are arranged in the optical path of the blue light LB. The second reflection mirror 8b and the third reflection mirror 8c guide the blue light LB transmitted through the second dichroic mirror 7b, to the light modulation device 4B.

The light modulation device 4R is formed of a liquid crystal panel 4RP, and polarizers, not illustrated, that are provided at the light incident side and the light exiting side of the liquid crystal panel 4RP, respectively. The light modulation device 4G is formed of a liquid crystal panel 4GP, and polarizers, not illustrated, that are provided at the light incident side and the light exiting side of the liquid crystal panel 4GP, respectively. The light modulation device 4B is formed of a liquid crystal panel 4BP, and polarizers, not illustrated, that are provided at the light incident side and the light exiting side of the liquid crystal panel 4BP, respectively. The light modulation device 4R modulates the red light LR, of the light emitted from the light source unit, according to an image signal. The light modulation device 4G modulates the green light LG, of the light emitted from the light source unit, according to an image signal. The light modulation device 4B modulates the blue light LB, of the light emitted from the light source unit, according to an image signal. Thus, the light modulation devices 4R, 9G, 4B form image light corresponding to their respective color lights.

At the light incident side of the light modulation device 4R, a field lens 9R parallelizing the red light LR incident on the light modulation device 4R is arranged. At the light incident side of the light modulation device 4G, a field lens 9G parallelizing the green light LG incident on the light modulation device 4G is arranged. At the light incident side of the light modulation device 4B, a field lens 9B parallelizing the blue light LB incident on the light modulation device 4B is arranged.

The light combining system 5 is formed of a substantially cubic cross dichroic prism. The light combining system 5 combines together the image lights of the individual colors from the light modulation devices 4R, 4G, 4B. The light combining system 5 emits the combined image light toward the optical projection unit.

The optical projection unit 17 projects the image light emitted from the image forming unit 16 in an enlarged form onto a screen, not illustrated. As the light is projected from the optical projection unit 17, an enlarged color image is displayed on the screen. The screen is arranged to the front (+X side) of and below (−Z side of) the projector device 10 shown in FIG. 1.

As shown in FIG. 4, the optical projection unit 17 in this embodiment is coupled in the +X-direction from the image forming unit 16. The optical projection unit 17 has a plurality of projection lenses 28. The number of projection lenses 28 is not particularly limited.

The power supply unit 18 supplies the illumination unit 15 with electric power supplied from an external power supply coupled to the projector device 10. The power supply unit 18 is arranged to the back (−X side) of the image forming unit 16 inside the exterior case 22. As shown in FIG. 5, the power supply unit 18 is arranged at a position overlapping a second base member 32, described later, as viewed in a plan view, and is fixed to the lower case 24.

Figure 8:
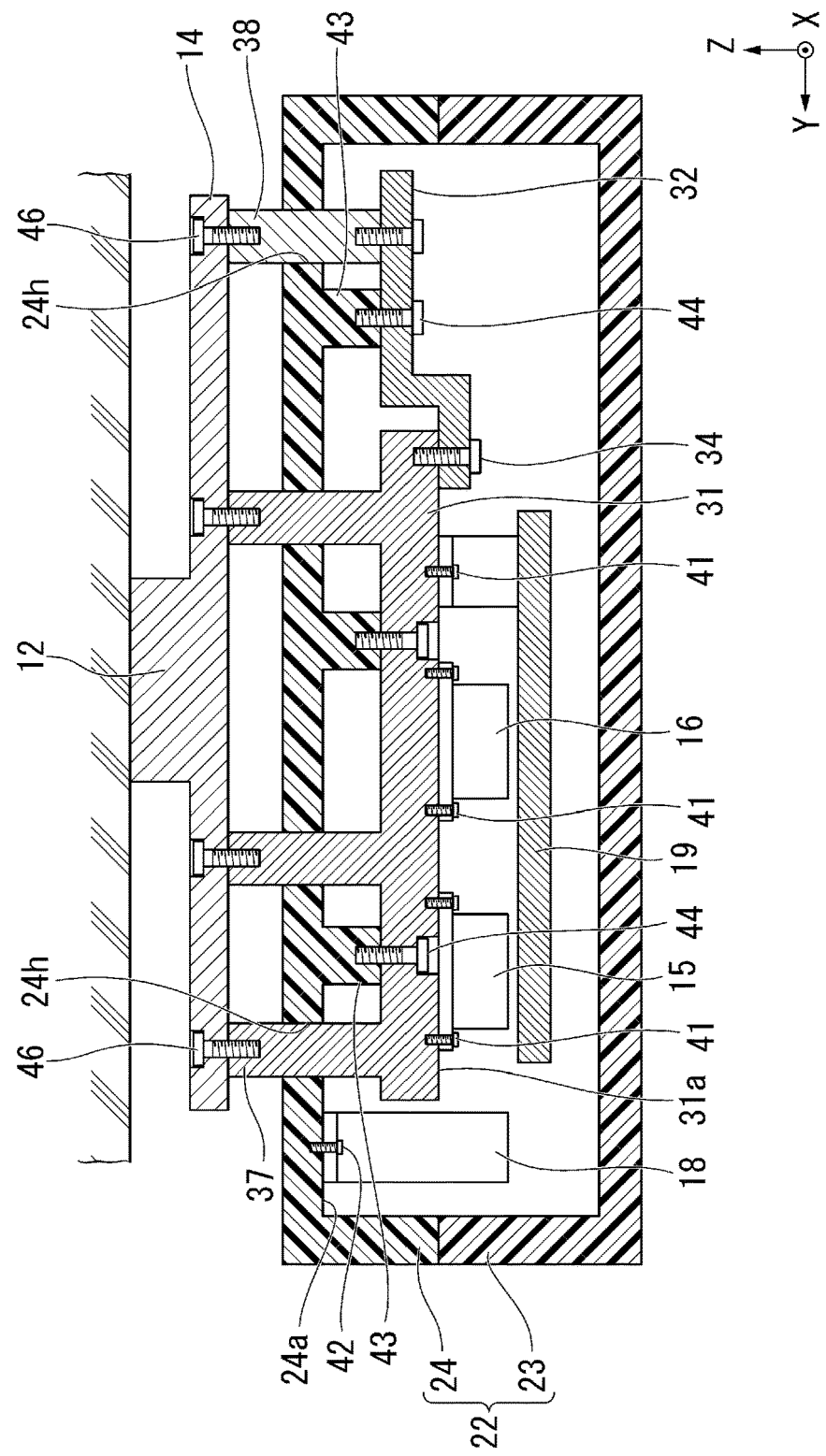
FIG. 8 is a conceptual view schematically showing the coupling structure of each part in the projector device.

The control unit 19 shown in FIG. 8 is formed of a circuit board controlling each part of the projector 11. At the control unit 19, various wirings are formed and various electronic components are loaded.

As shown in FIG. 5, the cooling fan 20 cools any cooling target arranged inside the exterior case 22. The cooling fan 20 includes an air suction fan sucking outside air into the exterior case 22, an air discharge fan discharging the air inside the exterior case 22 to outside, and the like. In this embodiment, the cooling fan 20 shown in FIG. 5 is an air discharge fan. The cooling fan 20 is formed, for example, of a sirocco fan, an axial fan or the like. However, the type of the fan is not particularly limited.

The cooling fan 20 is fixed to the exterior case 22. The specific method for fixing the cooling fan 20 is not particularly limited. The cooling fan 20 is fixed to the exterior case 22, for example, using a screw, an adhesive or the like. The cooling fan 20 may be fixed to the upper case 23 or may be fixed to the lower case 24.

Figure 6:
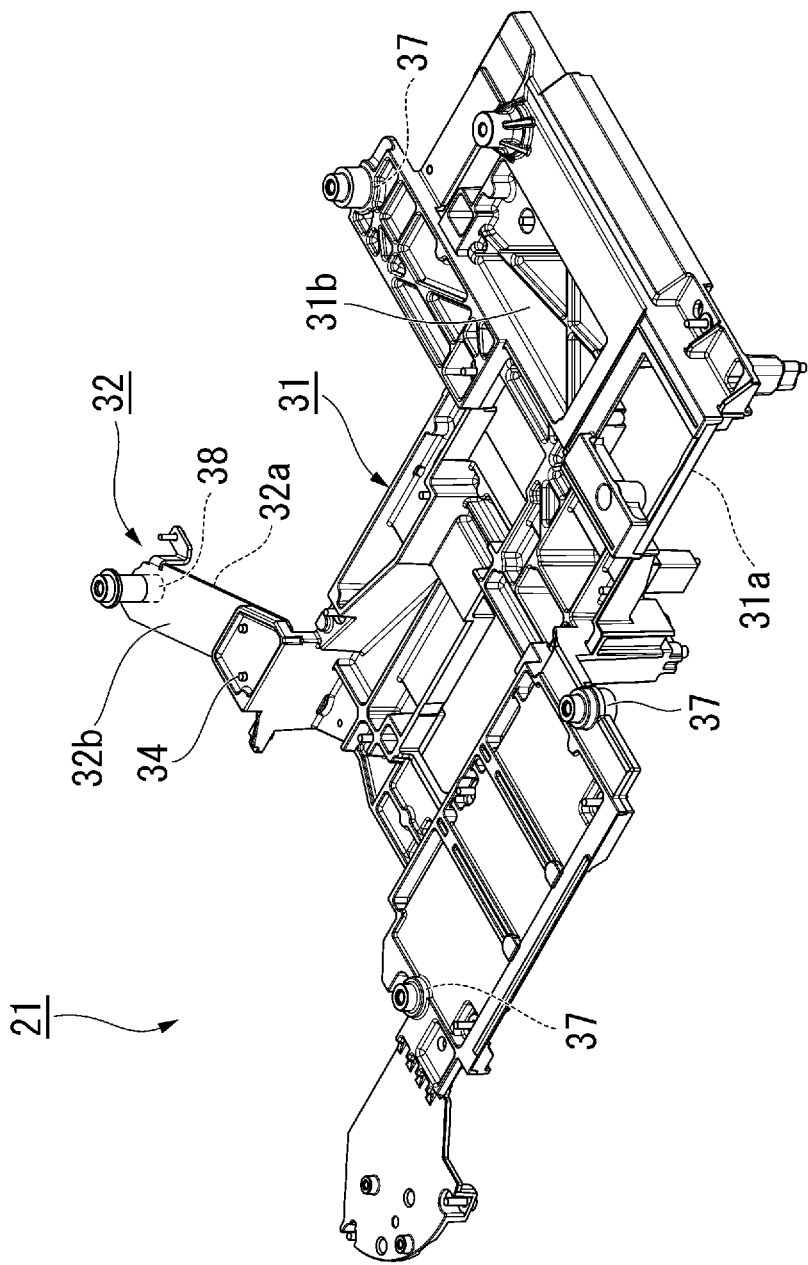
FIG. 6 is a perspective view of the base member.

FIG. 6 is a perspective view of the base member 21.

As shown in FIG. 6, the base member 21 has a first base member 31 and the second base member 32. The second base member 32 has a lower rigidity than the first base member 31. The projector 11 in this embodiment achieves an effect based on the difference in rigidity between the two base members 31, 32, which will be described in detail later.

The first base member 31 is formed of a metal material. The first base member 31 is formed substantially in a plate-like shape by casting a metal material in a metal mold. Alternatively, the first base member 31 may be produced by processing a metal plate by metal stamping, bending, cutting or the like. The first base member 31 has a first surface 31a and a second surface 31b opposite to the first surface 31a. The first surface 31a faces the illumination unit 15 and the image forming unit 16. The second surface 31b faces the lower case 24. The first base member 31 is not an entirely planar plate-like member but has a plurality of recesses, protrusions, and ribs.

Specifically, the first base member 31 is formed, for example, by aluminum die casting. The thickness of the first base member 31 varies depending on the site but is approximately 3 mm on average. The first base member 31 may also be formed of an iron-based metal as well as aluminum. The first base member 31 may also be formed of a crystalline resin as well as metal materials. An example of the crystalline resin may be an unsaturated polyester resin BMC (bulk molding compound).

As shown in FIG. 5, the first base member 31 is fixed inside the lower case 24. Specifically, a plurality of screw holes are provided in the first base member 31 and nut parts corresponding to the positions of the screw holes in the first base member 31 are provided in the lower case 24. The first base member 31 is fixed to the lower case 24 by having a plurality of screws 33 coupled to the plurality of nut parts in the lower case 24, respectively. In this embodiment, the screw 33 is provided at 14 positions. However, the number of screws 33 is not particularly limited.

The first base member 31 is arranged at a position overlapping the image forming unit 16 and the illumination unit 15, as viewed in a plan view. In the first base member 31, a vent 31h is provided at a position overlapping optical members such as the light modulation devices 4R, 4G, 4B and the light combining system 5 of the image forming unit 16. This provides a configuration in which cool air flowing inside the exterior case 22 can easily be applied to optical members such as the light modulation devices 4R, 4G, 4B and the light combining system 5 via the vent 31h. In the description below, the area where the light modulation devices 4R, 4G, 4B and the light combining system 5 are arranged in the image forming unit 16 is defined as a center part of the image forming unit 16.

The second base member 32 is formed of a metal material. The second base member 32 is formed in a plate-like shape using a metal plate. As shown in FIG. 6, the second base member 32 has a first surface 32a and a second surface 32b opposite to the first surface 32a. The first surface 32a faces the power supply unit 18. The second surface 32b faces the lower case 24. Alternatively, the second base member 32 may be produced by casting, similarly to the first base member 31. The second base member 32 is coupled to the first base member 31 with a screw 34.

Specifically, the second base member 32 is formed, for example, of an aluminum plate. The second base member 32 has a thickness of approximately 2 mm and is therefore thinner than the first base member 31. While it is desirable that the second base member 32 is formed of an aluminum-based metal, the material thereof is not particularly limited.

In this embodiment, both the first base member 31 and the second base member 32 are formed of aluminum. However, since the thickness of the second base member 32 is thinner than the thickness of the first base member 31 and the second base member 32 does not have such recesses, protrusions, and ribs as those in the first base member 31, the second base member 32 has a lower rigidity than the first base member 31. As a measure for making the rigidity of the second base member 32 lower than the rigidity of the first base member 31, a measure such as using different materials for the first base member 31 and the second base member 32 or providing a plurality of holes in the plate member forming the second base member 32 may be employed. A plurality of the above measures may be combined together.

As shown in FIG. 3, the lower case 24 has a plurality of penetration holes 24h for attaching the attachment metal fitting 14 of the suspension fitting 12. In this embodiment, the lower case 24 has four penetration holes 24h. The four penetration holes 24h are arranged at the front right side, the front left side, the back right side, and the back left side of the lower case 24 in such a way as to be located substantially in the corners of a trapezoid. The number and arrangement of penetration holes 24h are not particularly limited.

As shown in FIGS. 5 and 6, a plurality of first fixing parts 37 to which the suspension fitting 12 is fixed are provided at the second surface 31b of the first base member 31. In this embodiment, three first fixing parts 37 are provided at the second surface 31b of the first base member 31. The first fixing part 37 is formed, for example, of a cylindrical fixing nut such as an insert nut or a clinching nut. The first fixing part 37 may also be a screw hole protruding from the first base member 31. The three first fixing parts 37 are arranged corresponding to the positions of three penetration holes 24h, of the four penetration holes 24h in the lower case 24.

In this embodiment, the three first fixing parts 37 are arranged corresponding to the positions of the penetration holes 24h arranged at the front right side, the front left side, and the back left side of the lower case 24. In this way, the three first fixing parts 37 are provided at three positions that are spaced apart from the center part of the image forming unit 16 and that are not laid on a straight line. That is, the three first fixing parts 37 are arranged at positions corresponding to the vertices of a triangle. The three first fixing parts 37 are provided at positions spaced apart from the vent 31h.

The second fixing part 38, to which the suspension fitting 12 is fixed, is provided at the second surface 32b of the second base member 32. In this embodiment, one second fixing part 38 is provided at the second surface 32b of the second base member 32. The second fixing part 38 is formed, for example, of a cylindrical fixing nut such as an insert nut or a clinching nut, similarly to the first fixing part 37. The second fixing part 38 may also be a screw hole protruding from the second base member 32. The second fixing part 38 is arranged corresponding to the position of the one penetration hole 24h other than the three penetration holes 24h where the first fixing parts 37 are arranged, of the four penetration holes 24h in the lower case 24. In this embodiment, the second fixing part 38 is arranged corresponding to the position of the penetration hole 24h arranged at the back right side of the lower case 24. The three first fixing parts 37 and the one second fixing part 38 are configured to be inserted in the penetration holes 24h in the lower case 24 with the top parts of the individual fixing parts 37, 38 exposed to the outside of the lower case 24.

The attachment structure between individual members will now be described.

FIG. 8 is a conceptual view schematically showing the attachment structure of each member in the projector device 10. FIG. 8 shows a cross section. However, this cross section is not taken specifically at any particular site but schematically shows the positional relationship between individual members.

As shown in FIG. 8, the illumination unit 15, the image forming unit 16, and the control unit 19 are fixed to the first surface 31a of the first base member 31. Specifically, a screw insertion hole is provided at a flange part of the cases of the individual units 15, 16, 19, and a fixing screw 41 inserted in the screw insertion hole from the −Z side is tightened into the screw hole in the first base member 31, thus fixing the individual units 15, 16, 19 to the first surface 31a of the first base member 31.

The power supply unit 18 is fixed to an inner surface 24a of the lower case 24. Specifically, a screw insertion hole is provided at a flange part of the case of the power supply unit 18, and a fixing screw 42 inserted in the screw insertion hole from the −Z side is tightened into the screw hole in the lower case 24, thus fixing the power supply unit 18 to the inner surface 24a of the lower case 24.

The first base member 31 and the second base member 32 are each fixed to the lower case 24. Specifically, a plurality of base member attachment parts 43 formed of the foregoing fixing nut or the like are provided at the inner surface 24a of the lower case 24. In each of the first base member 31 and the second base member 32, a plurality of screw insertion holes penetrating each of the base members 31, 32 in the direction of thickness are provided. The first base member 31 and the second base member 32 are fixed to the inner surface 24a of the lower case 24 by having a fixing screw 44 inserted in the screw insertion hole from the −Z side and tightened into the screw hole of in the base member attachment part 43 of the lower case 24.

The attachment metal fitting 14 of the suspension fitting 12 are fixed to the three first fixing parts 37 of the first base member 31 and the one second fixing part 38 of the second base member 32. Specifically, the three first fixing parts 37 and the one second fixing part 38 are inserted in the penetration holes 24h in the lower case 24, protrude to the outside of the lower case 24, and come into contact with the attachment metal fitting 14. The attachment metal fitting 14 is fixed to the first base member 31 and the second base member 32 at the outside of the lower case 24 by having a fixing screw 46 inserted from the +Z side and tightened into the fixing nuts in the three first fixing parts 37 and the one second fixing part 38 protruding to the +Z side from the lower case 24.

To summarize the relationship of fixture between individual members, the illumination unit 15, the image forming unit 16, and the control unit 19 are fixed to the first base member 31. The suspension fitting 12 and the attachment metal fitting 14 are fixed to the first base member 31 and the second base member 32. The power supply unit 18 is fixed to the lower case 24. Although not shown in FIG. 4, the cooling fan 20 is fixed to the exterior case 22. While the control unit 19 is fixed to the first base member 31 in this embodiment, the control unit 19 is a relatively light-weight member having no optical influence and therefore may be fixed to the lower case 24 or the second base member 32.

As shown in FIGS. 1 and 2, the fall prevention wire 13 is coupled to the suspension fitting 12. At an end part of the fall prevention wire 13, an annular coupling member 51 is provided. At the bottom surface 22b of the exterior case 22, a wire coupling member 53 having an annular part 52 coupled to the coupling member 51 of the fall prevention wire 13 is provided. The wire coupling member 53 is coupled to the first base member 31 with a screw penetrating the lower case 24. Therefore, the fall prevention wire 13 coupled to the suspension fitting 12 is fixed to the first base member 31. That is, the fall prevention wire 13 couples the suspension fitting 12 and the first base member 31 together.

The fall prevention wire 13 in this embodiment is equivalent to a fall prevention member in the claims. The fall prevention member is not limited to a wire-like member and may be, for example, a band-like or plate-like member, provided that the fall prevention member can couple the suspension fitting 12 and the first base member 31 together.

As shown in FIG. 4, the camera unit 29 is coupled to the first base member 31 with a screw 47 penetrating the lower case 24. The camera unit 29 is used to pick up an image projected on the screen and correct the position of the image or the like. Since the camera unit 29 is fixed to the highly rigid first base member 31, a shift of the optical axis of the camera can be restrained.

The effects of the projector device 10 according to this embodiment will now be described.

First, problems of a related-art projector device will be described.

According to the related art, a projector having a configuration in which a ceiling suspension metal fitting and a metal base arranged inside a casing are coupled together with a screw or the like is proposed. In this configuration, the ceiling suspension metal fitting and the casing made of a resin are not coupled together. Therefore, the problem of reduction in the coupling strength between the projector and the suspension fitting due to the solvent cracking phenomenon can be avoided. Units such as a light source unit and an image forming unit inside the casing are fixed to the metal base.

However, for example, in the case where the ceiling suspension metal fitting and the metal base are fixed together with screws at four positions, when a part of the ceiling suspension metal fitting is strained and a certain degree of planarity is not secured, the strain of the ceiling suspension metal fitting may be reflected onto the metal base via the screws at the four positions, thus straining the metal base. Therefore, the units such as the light source unit and the image forming unit may shift from the original optical positions thereof, causing a drop in the quality of the projection image.

To cope with this problem, the projector 11 in this embodiment has: the exterior case 22 having the plurality of penetration holes 24h to attach the suspension fitting 12; the first base member 31 having the first surface 31a and the second surface 31b, and fixed inside the exterior case 22 and made of a metal or a crystalline resin; the illumination unit 15 fixed to the first surface 31a of the first base member 31; the image forming unit 16 fixed to the first surface 31a of the first base member 31 and generating image light from light emitted from the illumination unit 15; the optical projection unit 17 coupled to the image forming unit 16 and projecting the image light emitted from the image forming unit 16; and the second base member 32 fixed inside the exterior case 22 and coupled to the first base member 31, and having a lower rigidity than the first base member 31. The first base member 31 has the plurality of first fixing parts 37, which are provided at the second surface 31b of the first base member 31 and arranged corresponding to the position of a part of the plurality of penetration holes 24h in the exterior case 22 and to which the suspension fitting 12 is fixed. The second base member 32 has the second fixing part 38, which is arranged corresponding to the position of the penetration hole 24h other than the penetration holes 24h having the plurality of first fixing parts 37 arranged therein, of the plurality of penetration holes 24h in the exterior case 22, and to which the suspension fitting 12 is fixed.

In this configuration, the suspension fitting 12 is fixed to the first base member 31 made of a metal or a crystalline resin via the plurality of first fixing parts 37 when attaching the suspension fitting 12 to the projector 11. Therefore, a drop in the coupling strength between the projector 11 and the suspension fitting 12 due to the solvent cracking phenomenon can be restrained and the projector 11 and the suspension fitting 12 can be securely fixed together. Even if a part of the suspension fitting 12 is strained when the suspension fitting 12 is attached to the projector 11, the suspension fitting 12 is fixed to the second base member 32 having a lower rigidity than the first base member 31 via the second fixing part 38 and therefore the strain of the suspension fitting 12 is relaxed by the second base member 32 and is less likely to propagate to the first base member 31. Thus, the illumination unit 15 and the image forming unit 16 fixed to the first base member 31, and the optical projection unit 17 coupled to the image forming unit 16, are less likely to be optically misaligned and the quality of the projection image can be secured.

In the projector 11 in this embodiment, the plurality of first fixing parts 37 are formed of three first fixing parts 37. The three first fixing parts 37 are provided at three positions that are spaced apart from the center part of the image forming unit 16 and not laid on a straight line.

In this configuration, since the three first fixing parts 37 are arranged at the positions corresponding to the vertices of a triangle on the first base member 31, the second surface 31b of the first base member 31 is positioned in such a way as to face a predetermined direction in relation to the suspension fitting 12, and the first base member 31 and the suspension fitting 12 are stably fixed together. Thus, the illumination unit 15, the image forming unit 16, and the optical projection unit 17 are less likely to be optically misaligned.

In the projector 11 in this embodiment, the first base member 31 has the vent 31h at a position corresponding to the center part of the image forming unit 16. The three first fixing parts 37 are provided at positions spaced apart from the vent 31h.

In this configuration, since the three first fixing parts 37 of the first base member 31 are provided at the positions spaced apart from the vent 31h, the suspension fitting 12 and the first base member 31 can be fixed together without generating a strain. Also, the cool air flowing inside the exterior case 22 can cool the optical members such as the light modulation devices 4R, 4G, 4B and the light combining system 5 arranged at the center part of the image forming unit 16.

In the projector 11 in this embodiment, the fall prevention wire 13 coupled to the suspension fitting 12 is fixed to the first base member 31.

In this configuration, since the fall prevention wire 13 is fixed to the highly rigid first base member 31, even when a part of the coupling part between the suspension fitting 12 and the first base member 31 and the coupling part between the suspension fitting 12 and the second base member 32 is detached, the fall prevention wire 13 fixed to the first base member 31 can maintain the coupled state between the suspension fitting 12 and the projector 11 and thus can prevent the projector 11 from falling.

The projector 11 in this embodiment further includes the power supply unit 18. The power supply unit 18 is arranged at a position overlapping the second base member 32 as viewed in a plan view and is fixed to the exterior case 22.

In the state where the projector 11 is suspended with the suspension fitting 12, a large load is applied to the first base member 31. When the power supply unit 18 having a relatively heavy weight is fixed to the first base member 31, the load applied to the first base member 31 becomes even larger and therefore the first base member 31 needs to be reinforced. Consequently, the weight of the first base member 31 may increase and the weight of the entire projector 11 may increase. Meanwhile, the power supply unit 18 is not a member affecting the quality of the projection image and therefore need not be fixed to the first base member 31. Thus, in the above configuration, since the power supply unit 18 is fixed to the exterior case 22, the load applied to the first base member 31 can be reduced. Also, since the power supply unit 18 is arranged at the position overlapping the second base member 32, the increase in size of the projector 11 can be restrained and the degree of freedom in the layout of each member inside the exterior case 22 can be increased.

The projector device 10 according to this embodiment has the projector 11 and the suspension fitting 12 fixing the projector 11 in a suspended state. The projector 11 has: the exterior case 22 having the plurality of penetration holes 24h to which the suspension fitting 12 is attached; the first base member 31 having the first surface 31a and the second surface 31b, and fixed inside the exterior case 22 and made of a metal or a crystalline resin; the illumination unit 15 fixed to the first surface 31a of the first base member 31; the image forming unit 16 fixed to the first surface 31a of the first base member 31 and generating image light from light emitted from the illumination unit 15; the optical projection unit 17 coupled to the image forming unit 16 and projecting the image light emitted from the image forming unit 16; and the second base member 32 fixed inside the exterior case 22 and coupled to the first base member 31, and having a lower rigidity than the first base member 31. The first base member 31 has the plurality of first fixing parts 37, which are provided at the second surface 31b of the first base member 31 and arranged corresponding to the position of a part of the plurality of penetration holes 24h in the exterior case 22 and to which the suspension fitting 12 is fixed. The second base member 32 has the second fixing part 38, which is arranged corresponding to the position of the penetration hole 24h other than the penetration holes 24h having the plurality of first fixing parts 37 arranged therein, of the plurality of penetration holes 24h in the exterior case 22, and to which the suspension fitting 12 is fixed. The suspension fitting 12 has the attachment metal fitting 14 fixed to the plurality of first fixing parts 37 and the second fixing part 38 via the exterior case 22.

In this configuration, as in the projector 11 in the embodiment, even if the attachment metal fitting 14 of the suspension fitting 12 is strained, the illumination unit 15 and the image forming unit 16 fixed to the first base member 31, and the optical projection unit 17 coupled to the image forming unit 16, are less likely to be optically misaligned and the quality of the projection image can be secured. If the degree of planarity of the attachment metal fitting 14 needs such an accuracy as to satisfy the optical accuracy of the projector 11, the manufacturing cost of the suspension fitting 12 may increase. Meanwhile, according to the embodiment, the degree of planarity of the attachment metal fitting 14 need not be increased unnecessarily and therefore the manufacturing cost of the suspension fitting 12 can be reduced.

In the projector device 10 according to the embodiment, the second base member 32 has the lowest rigidity among the first base member 31, the second base member 32, and the attachment metal fitting 14.

In this configuration, the suspension fitting 12 can stably support the projector 11 in the suspended state.

The projector 11 in the embodiment may also have a configuration according to a modification example described below.

Figure 9:
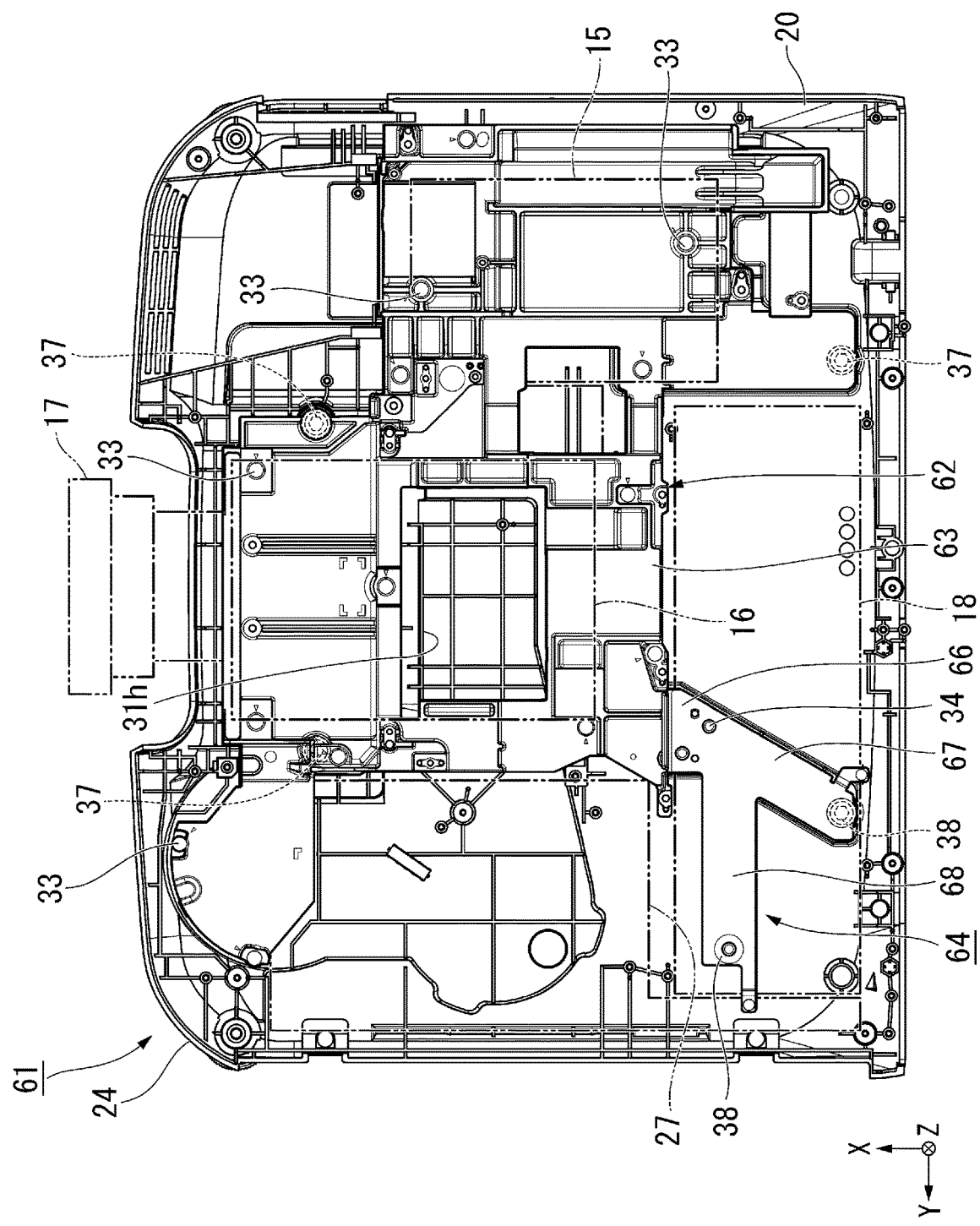
FIG. 9 is a plan view showing a state where a base member is fixed to a lower case in a projector according to a modification example.

FIG. 9 is a plan view showing a state where a base member 62 is fixed to the lower case 24 in a projector 61 according to the modification example. In FIG. 9, the same components as in the drawings used in the embodiment are denoted by the same reference signs and will not be described further in detail.

As shown in FIG. 9, also in the projector 61 according to the modification example, the base member 62 has a first base member 63 and a second base member 64. The second base member 64 has a lower rigidity than the first base member 63. The second base member 64 is coupled to the first base member 63 with the screw 34.

The second base member 64 has a coupling part 66 coupled to the first base member 63, and a first branching part 67 and a second branching part 68 branching into two directions from the coupling part 66. The second base member 64 is provided with a plurality of second fixing parts 38 to which the suspension fitting 12 is fixed. Specifically, the second base member 64 is provided with two second fixing parts 38. One second fixing part 38 is provided at the distal end of the first branching part 67. The other second fixing part 38 is provided at the distal end of the second branching part 68.

In this modification example, the lower case 24 has five penetration holes for attaching the attachment metal fitting 14 of the suspension fitting 12. The first base member 63 is provided with three first fixing parts 37 to which the suspension fitting 12 is fixed. The three first fixing parts 37 of the first base member 63 are arranged corresponding to the positions of three penetration holes, of the five penetration holes in the lower case 24. The two second fixing parts 38 of the second base member 64 are arranged corresponding to the positions of two penetration holes, of the five penetration holes in the lower case 24. The other parts of the configuration of the projector 61 are similar to those in the embodiment.

Also in the projector 61 according to this modification example, the strain of the suspension fitting 12 is relaxed by the second base member 64. Thus, effects similar to those in the embodiment can be achieved. For example, the illumination unit 15 and the image forming unit 16 or the like fixed to the first base member 63 are less likely to be optically misaligned and the quality of the projection image can be secured.

In the projector 61 according to the modification example, the second base member 64 has a plurality of second fixing parts 38.

In this configuration, the strain of the attachment metal fitting 14 can be sufficiently relaxed while the fixing strength between the second base member 64 and the suspension fitting 12 is secured. Also, changing designs such as the shape and dimension of the second base member 64 and the position of the second fixing part 38 enables proper adjustment of the strain relaxing effect for the suspension fitting 12.

The technical scope of the present disclosure is not limited to the foregoing embodiment. Various changes can be made without departing from the spirit and scope of the present disclosure.

The first fixing part provided at the second surface of the first base member and the second fixing part of the second base member according to the present disclosure represent the sites coupled to the suspension fitting. According to the present disclosure, the fixing measure such as the nut to attach the first base member and the second base member to the suspension fitting may be not only provided at the second surface but may also be provided over a range from the first surface to the second surface.

For example, while an example where the first base member and the second base member are formed of separate members is described in the embodiment, the first base member and the second base member may be integrated into a single member. Even when the first base member and the second base member are integrated into a single member, the rigidity can be made different between the first base member and the second base member by measures such as varying the thickness, providing or not providing ribs or recesses and protrusions, or providing a hole in the second base member, as described above.

In the embodiment, as a method for fixing the various members together such as the various units, the base member, the exterior case, and the suspension fitting, an example where the various members are fixed together with screws is described. However, screws need not necessarily be used. For example, an adhesive may be used for fixing. Alternatively, a protruding part may be provided at one member and a recessed part may be provided at another member, and the protruding part and the recessed part may be fitted together to fix the two members together. Also, a coupling member other than screws may be used. Two or more of the foregoing methods may be combined together.

In the embodiment, the power supply unit is arranged inside the exterior case. However, instead of this configuration, a configuration in which the power supply unit is not provided as a built-in unit but is separated as an AC adaptor and arranged outside the projector, may be employed.

In the embodiment, an example where the projector according to the present disclosure is applied to a projector using a liquid crystal light valve is described. However, this example is not limiting. The projector according to the present disclosure may also be applied to a projector using a digital micromirror device as a light modulation device. The projector may not have a plurality of light modulation devices and may have only one light modulation device.

Moreover, the specific configurations such as the number, arrangement, shape, and material of the various components forming the projector and the projector device are not limited to those in the embodiment and can be changed according to need.

According to one aspect of the present disclosure, a projector may have a configuration described below.

According to one aspect of the present disclosure, a projector includes: an exterior case having a plurality of penetration holes to which a suspension fitting is attached; a first base member having a first surface and a second surface opposite to the first surface, and fixed inside the exterior case and made of a metal or a crystalline resin; an illumination unit fixed to the first surface of the first base member; an image forming unit fixed to the first surface of the first base member and generating image light from light emitted from the illumination unit; an optical projection unit coupled to the image forming unit and projecting the image light emitted from the image forming unit; and a second base member fixed inside the exterior case and coupled to the first base member, and having a lower rigidity than the first base member. The first base member has a plurality of first fixing parts which are provided at the second surface of the first base member and arranged corresponding to a position of a part of the plurality of penetration holes in the exterior case and to which the suspension fitting is fixed. The second base member has a second fixing part which is arranged corresponding to a position of a penetration hole other than the penetration holes having the plurality of first fixing parts arranged therein, of the plurality of penetration holes in the exterior case, and to which the suspension fitting is fixed.

In the projector according to the one aspect of the present disclosure, the plurality of first fixing parts may be formed of three first fixing parts. The three first fixing parts may be provided at three positions that are spaced apart from a center part of the image forming unit and not laid on a straight line.

In the projector according to the one aspect of the present disclosure, the first base member may have a vent at a position corresponding to the center part of the image forming unit. The three first fixing parts may be provided at a position spaced apart from the vent.

In the projector according to the one aspect of the present disclosure, a fall prevention member coupled to the suspension fitting may be fixed to the first base member.

In the projector according to the one aspect of the present disclosure, the second base member may have a plurality of the second fixing parts.

The projector according to the one aspect of the present disclosure may further include a power supply unit. The power supply unit may be arranged at a position overlapping the second base member as viewed from a direction of a normal line to the first surface and may be fixed to the exterior case.

According to another aspect of the present disclosure, a projector device includes: a projector; and a suspension fitting fixing the projector in a suspended state. The projector includes: an exterior case having a plurality of penetration holes to which the suspension fitting is attached; a first base member having a first surface and a second surface opposite to the first surface, and fixed inside the exterior case and made of a metal or a crystalline resin; an illumination unit fixed to the first surface of the first base member; an image forming unit fixed to the first surface of the first base member and generating image light from light emitted from the illumination unit; an optical projection unit coupled to the image forming unit and projecting the image light emitted from the image forming unit; and a second base member fixed inside the exterior case and coupled to the first base member, and having a lower rigidity than the first base member. The first base member has a plurality of first fixing parts which are provided at the second surface of the first base member and arranged corresponding to a position of a part of the plurality of penetration holes in the exterior case and to which the suspension fitting is fixed. The second base member has a second fixing part which is arranged corresponding to a position of a penetration hole other than the penetration holes having the plurality of first fixing parts arranged therein, of the plurality of penetration holes in the exterior case, and to which the suspension fitting is fixed. The suspension fitting has an attachment member fixed to the plurality of first fixing parts and the second fixing part via the exterior case.

In the projector device according to the above aspect of the present disclosure, the second base member may have a lowest rigidity among the first base member, the second base member, and the attachment member.

What is claimed is:

1. A projector comprising:
an exterior case having a plurality of penetration holes to which a suspension fitting is attached;
a first base member having a first surface and a second surface opposite to the first surface, and fixed inside the exterior case and made of a metal or a crystalline resin;
an illumination unit fixed to the first surface of the first base member;
an image forming unit fixed to the first surface of the first base member and generating image light from light emitted from the illumination unit;
an optical projection unit coupled to the image forming unit and projecting the image light emitted from the image forming unit; and
a second base member fixed inside the exterior case and coupled to the first base member, and having a lower rigidity than the first base member,
the first base member having a plurality of first fixing parts which are provided at the second surface of the first base member and arranged corresponding to a position of a part of the plurality of penetration holes in the exterior case and to which the suspension fitting is fixed,
the second base member having a second fixing part which is arranged corresponding to a position of a penetration hole other than the penetration holes having the plurality of first fixing parts arranged therein, of the plurality of penetration holes in the exterior case, and to which the suspension fitting is fixed.

2. The projector according to claim 1, wherein
the plurality of first fixing parts are formed of three first fixing parts, and
the three first fixing parts are provided at three positions that are spaced apart from a center part of the image forming unit and not laid on a straight line.

3. The projector according to claim 2, wherein
the first base member has a vent at a position corresponding to the center part of the image forming unit, and the three first fixing parts are provided at a position spaced apart from the vent.

4. The projector according to claim 1, wherein
a fall prevention member coupled to the suspension fitting is fixed to the first base member.

5. The projector according to claim 1, wherein
the second base member has a plurality of the second fixing parts.

6. The projector according to claim 1, further comprising:
a power supply unit, wherein
the power supply unit is arranged at a position overlapping the second base member as viewed from a direction of a normal line to the first surface and is fixed to the exterior case.

7. A projector device comprising:
a projector; and
a suspension fitting fixing the projector in a suspended state,
the projector comprising:
an exterior case having a plurality of penetration holes to which the suspension fitting is attached;
a first base member having a first surface and a second surface opposite to the first surface, and fixed inside the exterior case and made of a metal or a crystalline resin;
an illumination unit fixed to the first surface of the first base member;
an image forming unit fixed to the first surface of the first base member and generating image light from light emitted from the illumination unit;
an optical projection unit coupled to the image forming unit and projecting the image light emitted from the image forming unit; and
a second base member fixed inside the exterior case and coupled to the first base member, and having a lower rigidity than the first base member,
the first base member having a plurality of first fixing parts which are provided at the second surface of the first base member and arranged corresponding to a position of apart of the plurality of penetration holes in the exterior case and to which the suspension fitting is fixed,
the second base member having a second fixing part which is arranged corresponding to a position of a penetration hole other than the penetration holes having the plurality of first fixing parts arranged therein, of the plurality of penetration holes in the exterior case, and to which the suspension fitting is fixed,
the suspension fitting having an attachment member fixed to the plurality of first fixing parts and the second fixing part via the exterior case.

8. The projector device according to claim 7, wherein
the second base member has a lowest rigidity among the first base member, the second base member, and the attachment member.

* * * * *